United States Patent [19]

Stein

[11] 4,284,597

[45] Aug. 18, 1981

[54] APPARATUS FOR STRIPPING A SOLID MASS IN A STRIP FROM A MILL

[75] Inventor: Edward I. Stein, Ballston Lake, N.Y.

[73] Assignee: General Electric Company, Waterford, N.Y.

[21] Appl. No.: 20,129

[22] Filed: Mar. 13, 1979

[51] Int. Cl.³ .................... B29H 21/04; B29H 21/06
[52] U.S. Cl. ...................................... 264/130; 83/78; 83/111; 83/112; 83/156; 83/922; 264/131; 264/146; 264/175; 425/104; 425/201; 425/296; 425/308; 425/310; 425/363
[58] Field of Search .............. 425/104, 296, 308, 310, 425/363, 201; 264/130, 146, 175, 349, 144, 131; 83/78, 111–112, 156, 922

[56] References Cited

U.S. PATENT DOCUMENTS

| | | | |
|---|---|---|---|
| 1,897,961 | 2/1933 | Snyder | 264/349 |
| 2,540,195 | 2/1951 | Engler | 264/349 |
| 2,593,667 | 4/1952 | Gora | 264/349 |
| 2,629,129 | 2/1953 | Hanson et al. | 264/349 |
| 2,879,173 | 3/1959 | Yacoe | 264/130 |
| 2,890,188 | 6/1959 | Konkle et al. | 260/29.1 R |
| 2,935,765 | 5/1960 | Ciampolini | 264/130 |
| 2,954,357 | 9/1960 | Fekete | 260/29.1 R |
| 3,464,945 | 9/1969 | Martellock | 260/29.1 SB |
| 3,919,161 | 11/1975 | Glaister et al. | 260/37 SB |
| 3,933,726 | 1/1976 | Glaister | 260/37 SB |

Primary Examiner—Jeffery R. Thurlow
Attorney, Agent, or Firm—John L. Young; Michael J. Doyle; Philip L. Schlamp

[57] ABSTRACT

An apparatus for stripping continuously a solid mass in a strip from a two roll mill comprising a frame; knife means at a first end of said frame adapted to cut a strip of solid mass from said two roll mill; first roller means adapted to receive the cut strip and pass it through a dusting means which applies a non-stick powder on said cut strip. Second roller means in said dusting means adapted to pass said dusted cut strip through such dusting means into a packaging container. There is also envisioned a novel means for fixing the distance of the knife means from the two roll mill with precision.

14 Claims, 7 Drawing Figures

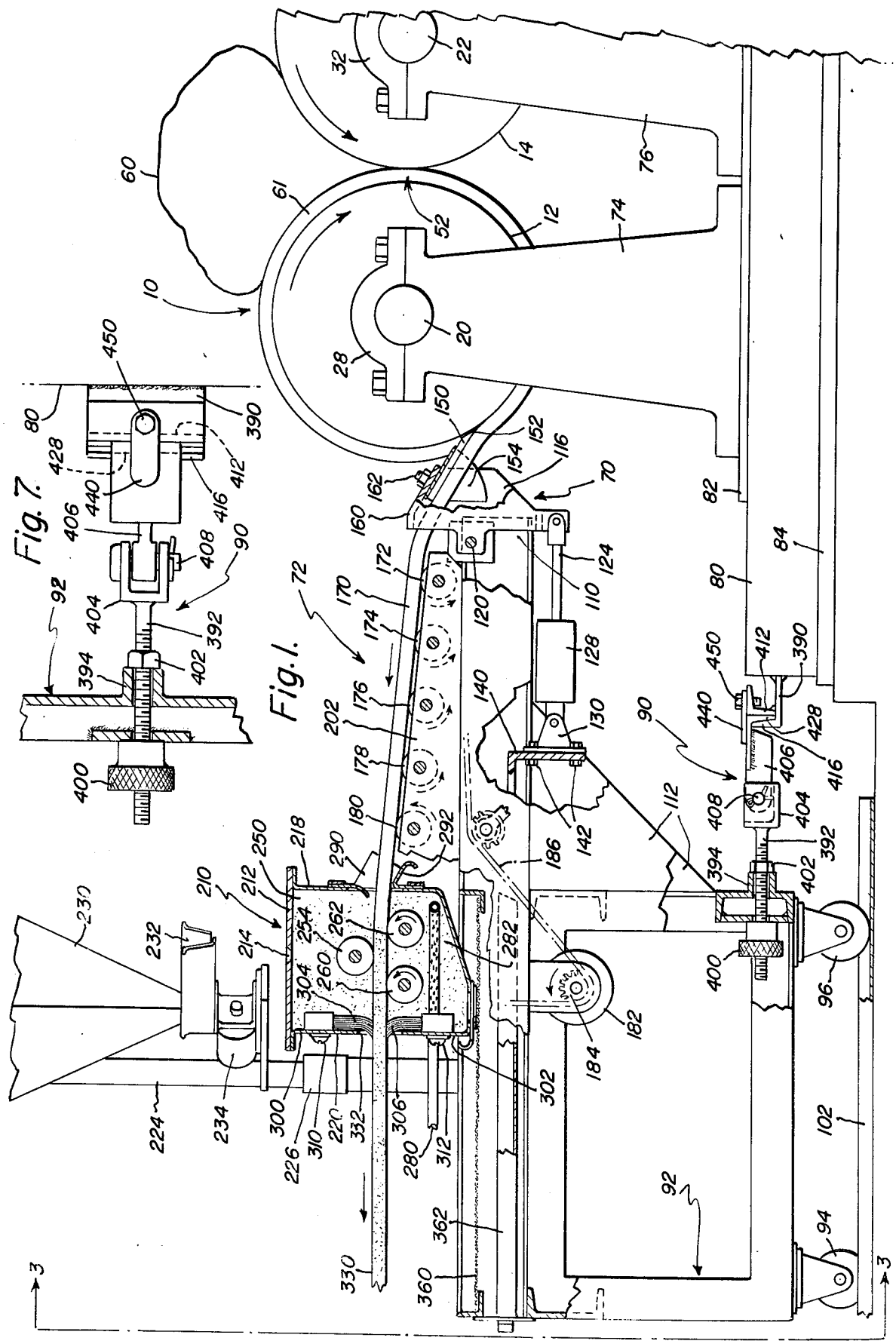

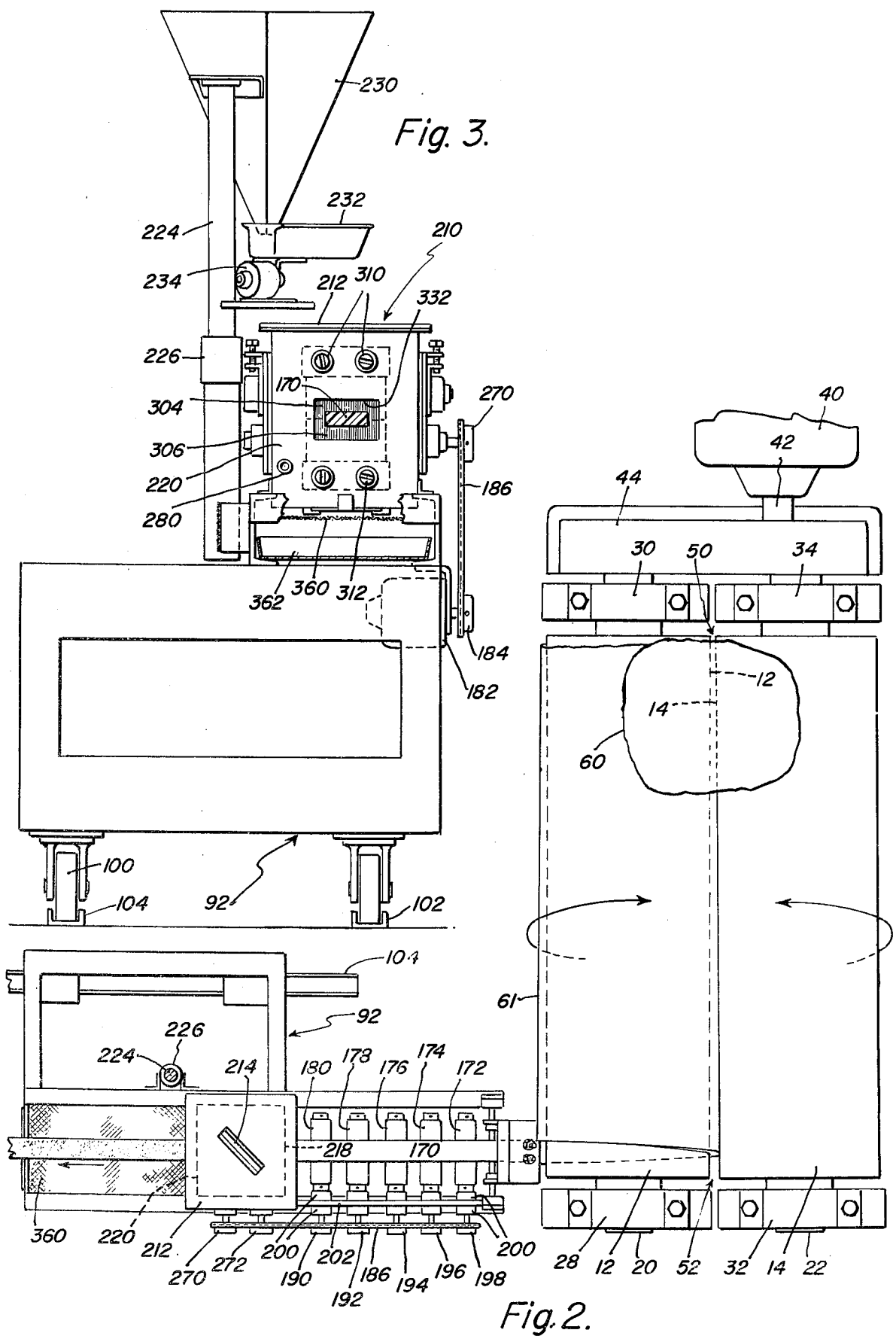

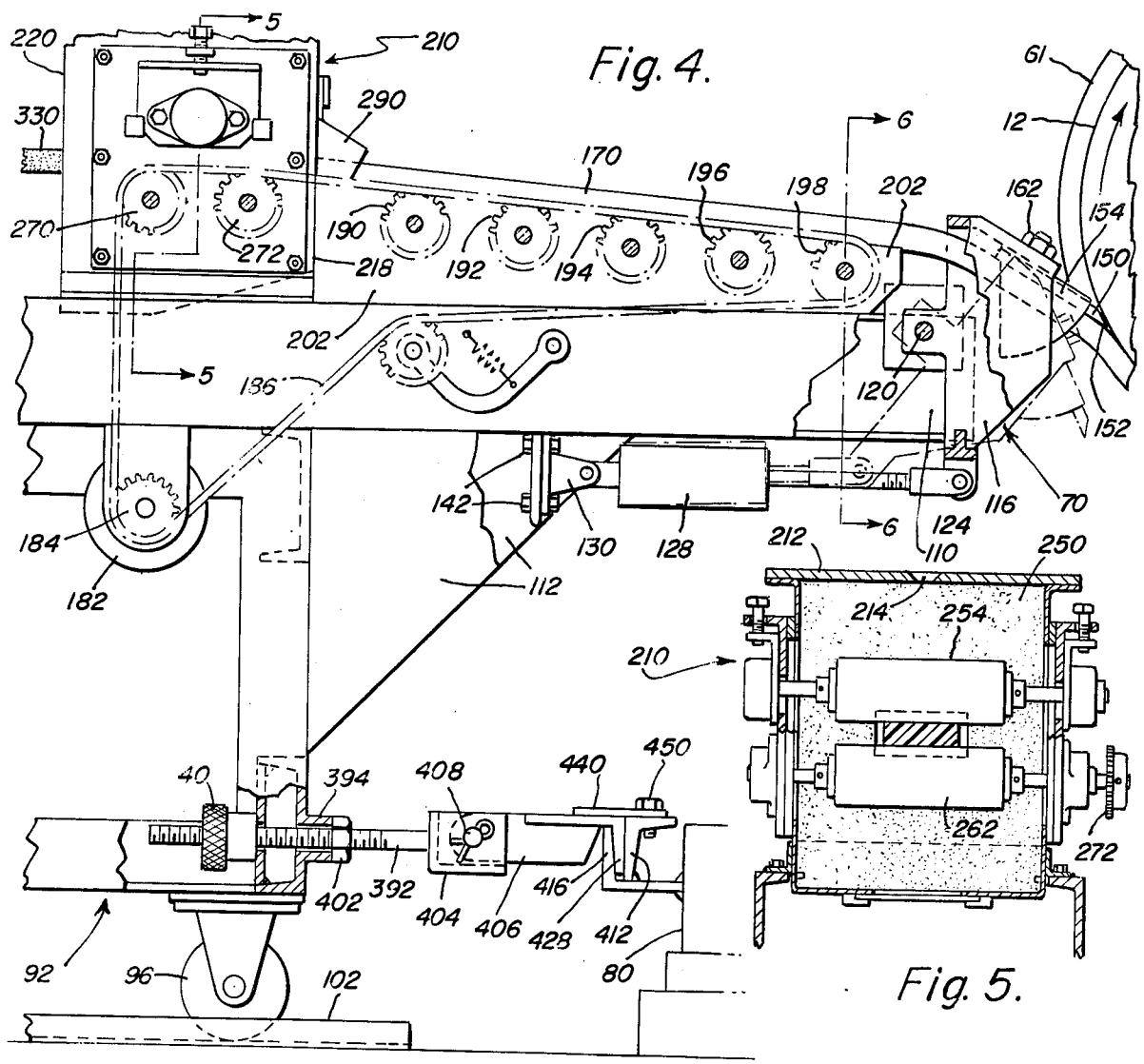
Fig. 4.
Fig. 5.
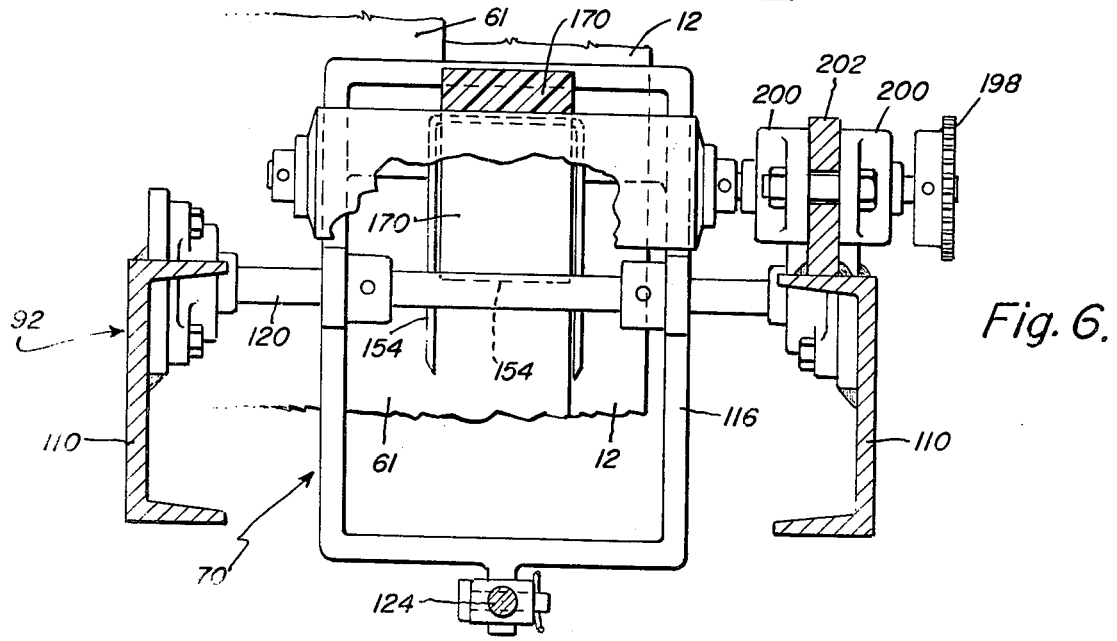
Fig. 6.

APPARATUS FOR STRIPPING A SOLID MASS IN A STRIP FROM A MILL

BACKGROUND OF THE INVENTION

The present invention relates to two roll mills and more particularly the present relates to an apparatus for stripping a solid mass in a strip continuously from a two roll mill.

Heat vulcanizable silicone rubber compositions are well-known. Such compositions generally comprise, as the basic ingredient a diorganopolysiloxane polymers reinforcing fillers such as precipitated silica or fumed silica or extending fillers such as lithopone, titanium dioxide, zinc oxide, iron oxide and so forth. Most commonly there is incorporated in such compositions fillers such as fumed silica or precipitated silica. To the resulting composition there is added process aids to facilitate the incorporation of the filler in the diorganopolysiloxane gum polymer. Examples of such process aids are for instance to be found in the Patents of Martellock, Konkle and Fekete which are U.S. Pat. Nos. 3,464,945, 2,890,188 and 2,954,357, which disclose, for instance, nitrogen functional silanes, silanol functional silanes and alkoxy functional silanes as process aids for heat vulcanizable silicone rubber compositions. Such process aids are incorporated into such compositions for two purposes: first, to facilitate the mixing of the filler into the diorganopolysiloxane gum and second to prevent the composition from structuring. Structuring is the phenomena where an uncured composition having silica filler in a diorganopolysiloxane gum will set up or harden prior to cure upon being stored in the uncured condition. It should be noted that such a process aid as disclosed above alleviates to some extent this structuring condition, but do not eliminate it entirely.

Finally, in the heat vulcanizable silicone rubber composition or heat curable silicone rubber composition there may be incorporated various other additives such as compression set additives, flame-retardant additives such as platinum and carbon black and various other additives. The resulting composition may then be taken and there may be incorporated into it an alkyl peroxide as a catalyst. The resulting composition with the alkyl peroxide as a catalyst such as dicumyl peroxide or benzoyl peroxide in it when heated to temperatures above 150° C. will cure to a silicone elastomer. However, in the absence of the peroxide catalyst being incorporated into the composition and even with the peroxide catalyst in some cases, the composition can be stored in the uncured state with all of the ingredients mixed in it except the catalyst for a substantial period of time, such as from one month to a year without any deleterious effects in the composition. The only deleterious effect that is noted in the composition is the phenomena known as structuring which was explained above. Generally, such structuring will comprise the compositions setting up or hardening in the form in which it is formed prior to storage, such that it is very difficult to form into a different shape. It is desirable to form the composition into certain desired shapes in which it is to be sold to customers.

It is common for the silicone manufacturer to take two or three months from the start of the mixing procedure to the time when the composition is ready to be packaged and shipped to customers. Accordingly during such interval of time, the composition may structure. To eliminate the structuring of such composition, it is common in silicone manufacturing facilities to mill mixed but uncatalyzed heat curable vulcanizable silicone rubber compositions on a two roll mill. Simply, this involves taking 25 pound slabs of the strained and mixed components of the heat vulcanizable silicone rubber composition and putting them on the two roll mill where one roller is traveling faster than the other. The milling of the two roll mill forces the structure composition to achieve a molecular breakdown in the structure mass such that there is obtained as a result of the milling procedure pliable sheets of uncured heat vulcanizable silicone rubber composition. In the past, when sufficient amounts of the uncured heat vulcanizable silicone rubber composition had been placed on the mill so as to completely cover one roll, the entire roller portion of the uncured heat vulcanizable silicone rubber composition would be cut across the entire length of the roll so that the sheet of uncured heat vulcanizable silicone rubber composition could fall by gravity to the ground. This uncured sheet of silicone rubber composition would then be taken and cut to the desired strips and powdered with talc or some other non-stick powder and placed in containers to be shipped to the customer, all of which was done manually. When the customer wanted continuous strips of said uncured heat vulcanizable silicone rubber composition of 1,000 lbs. or more, the practice was to take the cut strips that were produced from the sheet that was taken from the two roll mill, and feed them to an extruder where the extruder would extrude out a continuous strip of 1 inch thick by 3 inches wide, which strip would be taken and talc applied to it so as to improve the non-stickness of the strip. Then the strip would be manually guided into a container so that it could be packaged in amounts of up to 1,200 lbs. for shipment to the customer as was desired. Accordingly, it was highly desirable to be able to have an apparatus which would continuously strip by machinery, in a rapid and efficient manner, a continuous strip of uncured heat vulcanizable silicone rubber composition from a two roll mill, dust said cut strip and have it ready for packaging in containers of up to 1,200 lbs.

Accordingly, it is one object of the present invention to provide for an apparatus for continuously cutting a strip of uncured heat vulcanizable silicone rubber composition from a two roll mill; dust the strip with a non-stick powder and present it for packaging in a container.

It is another object of the present invention to provide an apparatus for continuously cutting a strip of solid material from a two roll mill and present the cut strip for dusting continuously and then packaging it.

It is an additional object of the instant invention to provide an apparatus for continuously cutting a strip of uncured heat vulcanizable silicone rubber composition from a two roll mill and present it continuously into a dusting chamber to be continuously dusted with talc and then passed continuously into a packaging container of any weight that is desired by the customer.

It is still an additional object of the present invention to provide a process for continuously cutting a strip of uncured heat vulcanizable silicone rubber composition from a mass of the composition on the two roll mill and pass continuously the cut strip into a dusting chamber and then dust the strip so that a non-stick powder is allowed to cover the strip and then pass the strip continuously into a package.

It is yet an additional object of the present invention to provide a means for precisely adjusting the distance between the cutting edge of a knife of a stripping machine that is presented to the surface of a two roll mill. These and other objects of the present invention are accomplished by means of the disclosure set forth herein below.

SUMMARY OF THE INVENTION

In accordance with the above objects there is provided by the present invention an apparatus for stripping continuously a solid mass in a strip from a two roll mill comprising a frame; knife means at the first end of said frame adapted to cut a strip of solid mass from said two roll mill; first roller means on said frame adjacent said knife means for passing back said cut strip of solid mass toward the second end of said frame opposite said first end; dusting means adjacent said first roller means through which said cut strip of solid mass passes adapted to dust said cut strip of solid mass with said non-stick powder; and second roller means in said dusting means for carrying the cut strip of solid mass through said dusting means from said first roller means and said second roller means passing said cut strip of solid mass to the second end of said frame f or being guided into a package.

There is also provided by the present invention a process for continuously stripping a solid mass from a two roll mill in a strip; dusting the strip with talc and packaging the strip comprising (a) passing the solid mass of a two roll mill in which in one end of the mill the rollers are closer together then the other end; (b) presenting a solid mass wrapped around one of the rolls continuously at the end of one of the rolls which are widest apart to knife means; (c) continuously cutting a strip of solid mass from said mill rolls by said knife means that passes the cut strip over first roller means which passes said cut strip away from said mill at the same rate as said cut strip is cut; (d) transmitting said cut strip through dusting means so as to cover it with talc to make the strip relatively non-sticky and (e) passing said cut strip from said dusting means by second roller means to be taken manually and arranged in a box so that it may be packaged.

DESCRIPTION OF THE PREFERRED EMBODIMENT

FIG. 1, is a side view of a two roll mill with the apparatus of the instant invention.

FIG. 2 is a top plain view of a two roll mill with the apparatus of the present invention.

FIG. 3 is an end view along lines 3, 3 of FIG. 1.

FIG. 4 is an end view similar to FIG. 1 of the apparatus of the instant invention.

FIG. 5 is a cross-sectional view along line 5, 5 of FIG. 4.

FIG. 6 is a cross-sectional view along line 6,6 of FIG. 4, while

FIG. 7 is a top plan view of adjustment means of FIG. 1.

Before going into the apparatus of the instant invention it is necessary to look at the construction of a typical two roll mill. Such typical two roll mill 10 is shown in FIGS. 1 and 2 comprising a roller 12 and a roller 14 which have shafts 20 and 22 are supported by bearing 28 and 30 and 32 and 34 respectively. As seen in FIG. 2, a drive motion drive 40 a shaft 42 drives gears in gear box 44 which drives the shaft 20 and 22 so as to drive rollers 12 and 14 respectively. As will be noted, the distance between rollers 12 and 14 at the far end 50 is smaller than the distance between the rollers at the near end 52. Generally, the distance between the rollers will vary from 1/16 inch to ⅛ inch to 1 inch. difference between the far end 50 and the near end 52. It should be noted that the closer the two rolls of the two roll mill, 12 and 14 are together, the better will be the mixing of the material. It should also be noted that by having the near end a wider distance from roller to roller, that is from roller 12 to roller 14, at 52, then the distance between roller 12 and 14 is at 50, the material that is placed on the mill and specifically a green heat vulcanizable silicone rubber composition 60 that is placed at the far end of the two roll mill at 50 will gravitate as it is milled toward near end 52. This is a naturally occurring phenomena as more material is put on a mill, that such material gravitates from far end 50 to near end 52 on the two roll mills 12 and 14 by the natural rotation of the mill rolls. It should be noted that mills 12 and 14 are placed at a different distance from each other at far end 50 and near end 52 by merely cocking the bearings as is provided for in mills of this type. It should also be noted that by having front roll 12 of the mill go faster than the back roll of the mill, the green material of the uncured heat vulcanizable silicone rubber composition that has structure that is put in near end 50 on the two rolls 12 and 14 of two roll 10 will wrap itself around the faster roll. Accordingly, mill roll 14 can be adjusted to rotate counter clockwise at a speed of anywhere from 60 to 70 revolutions per minute and roll 12 of the two roll mill can be made to rotate clockwise at a speed of anywhere from 75 to 85 rotations per minute such that the green material 60 will wrap itself around in a sheet around roll 12 and gravitate from far end 50 to near end 52 thereby presenting itself to being cut by the knife means 70 on cutting and dusting apparatus 72. Before leaving the two roll mill it should be noted that the bearings 28, 30, 32 and 34 are present in bearing pedestals such as pedestal 74 and 76 which are supported on platform 80 which is in turn supported by fixed mazanine platforms to the ground, platforms 82 and 84. Platforms 82 and 84 are fixed to the ground. It should be noted that platform 80 is connected to cutting and dusting apparatus 72 by means of an adjusting means 90, which will be explained hereinafter.

The apparatus of the instant invention and the cutting and dusting of the instant invention comprises; a frame 92 supported by rollers 94 and 96 as well as two rollers in back of rollers 94 and 96 respectively seen from FIG. 1, that is for instance, roller 100 as seen in FIG. 3 which rollers are adapted to transput the platform on tracks 102 and 104. By this means and by adjusting means 90 of FIG. 7 the entire apparatus of the present invention can be made to slide on the track, that is to the frame 92 being supported by rollers 94 and 96 and 100 and the roller not shown in front of roller 100 in FIG. 3 and such rollers may be made to slide in to tracks 102 and 104 so that the entire apparatus may be easily moved in close proximity or away from the two roll mill 10. In one preferred embodiment of the instant invention, adjusting means 90 is utilized to adjust the distance of knife means 70 a precise distance from the sheet of green uncured heat vulcanizable silicone rubber composition 61 that is wrapped around roller 12, also from the surface of roller 12. Going further into cutting and dusting apparatus 72, there is attached to the frame a front portion 110 supported on frame 92 partly by bracket 112. On the front 110 of frame 92 pivotly mounted knifing bracket 116 which pivots around pin 120 on front end 110. The lower portion of knifing bracket 116 is connected to rod 124 which is driven by piston 128 pivotly connected to bracket 130 which is connected to flange 140 through screws and bolts 142, flange 140 on front end 110.

Knife member 150 having blade 152 is attached to knife bracket 116 through extending member 154 which is bolted down through member 160 by bolt and nut 162. In this manner the knife blade 152 can cut a strip and a continuous strip from near point on two roll mill, roll 12 of sheet of uncured heat vulcanizable silicone rubber composition sheet 61, which strip of material can be cut off continuously and passed on to the other points in apparatus 72. Generally, the knife blade 152 of knife member 150 is about 3 inches wide, although it can be picked at any width such that for instance a strip 3 inches wide by 1 inch thick of the sheet 61 of uncured heat vulcanizable silicone rubber composition or other solid mass, is cut away continuously from sheet 61 on roll 12 of two roll mill 10, said strip being 170. Said strip has to be initially fed through power rollers 172 through 180. Although there are shown to be five such rollers in FIGS. 1 and 2. It can be understood that this amount of rollers can vary. There is preferably utilized five rollers since that drives the cut strip 170 with the most efficiency and without the strip breaking or moving in an undesirable manner. Rollers 172 through 180 are driven by motor 182 through sprocket 184 and sprocket 186 through sprockets 190 to 198, which are connected to rollers 180, 178, 176, 174, 172 respectively through bearings generally shown at 200 supported in plate 202 attached to frame to forward end 110 of frame 92. Rollers 170 through 180 drive support and drive the strip 170 such that it does not move laterally and such that it moves at the speed at which it is cut by knife member 150 and given up by roll 12 such that the rollers 172 through 180 take up the cut strip 170 at the same rate at which it is cut off the mill. Rollers 172 through 180 pass strip 170 using to housing 210 having a top 212 with opening 214 and sides 218 and 220. Box 210 is supported by frame 92. Support member 224 with sleeve 226 which is supported on frame 92 supports hopper 230 which allows talc to fall into spreader 232 which is vibrated by vibrator 234 so as to allow talc to fall out of spreader 232 through opening 214 in box 210 into chamber 250. The talc in chamber 250 falls on three rollers, floater roller 254 and rollers 260 and 262. It should be noted that rollers 254, 260 and 262 are also driven by motor 182 through sprocket 184 and sprocket chain 186 to sprockets 270, 272 through the appropriate bearings in the side walls of frame 92 with the appropriate bearings in the side wall of box 210 drive rollers 260 and 262 with roller 254 rotating freely. The talc which falls through opening 214 falls on top of the strip 170 and coats it with talc such to provide a non-stick surface for the cut strip 170. Talc also falls through the bottom of box 210 where there is forced through an air vent 280 at the lower end 282 of box 210 so as to scatter the talc throughout the entire box 210 so that the strip 170 will uniformly and completely be covered by the talc both on the bottom and the top sides. It should be noted that although it is not necessarily so, it is desirable all the rollers are coated with a light cloth, such as that to be found in paint rollers, since that provides the best carrying surface for the strip 170 and also provides for the most even disposition of talc on the strip 170 without scratching the surface of the strip 170.

It should also be noted that it is preferred that motor 182 be an air motor, since that allows the roller to be driven with precision and within proper amount of drive so as to remove strip 170 at the same rate at which it is being cut away from sheet 61 from roller 12. It can also be appreciated that the motor may be an electric motor which such as a DC motor which is precisely controlled to have the same effect as an air motor. The forward side of box 210, that is the forward end 218 of box 210 comprises two flanges 290 and 292 which permit the strip 170 to enter the box with a minimum of talc being blown out of the box by the air that is vented into the box through air ventilator 280. At rear side 220 of box 210 there is appended both to the upper portion 300 of side 220 as well as the lower portion 302 of side 220 brushes 304 and 306 which are affixed to side 300 and 302 by nuts and bolts 310 and 312 respectively. These brushes 304 and 306 can be made from the same bristles as any paint brush and generally comprise a brush to sweep the surface of talc covered strip 330 as it leaves opening 332 in this side 220 of house 210 so as to sweep excess talc to remain in box 210. Any excess talc that is present or still on the surface of coated strip 330 falls from strip 330 on to perforated plate 360 where it falls through the openings in the perforated plate into collector 362 where it may be collected and reused by being added to the talc in hopper 230.

It can be appreciated that any non-stick powder can be applied that is compatable with an uncured heat vulcanizable silicone rubber composition can be applied as a powder in the instant invention to make the coated strip 330 non-sticky. There are three requirements for further non-stick powder; first the powder must make the cut strip 170 non-sticky when it is coated with it; secondly it has to inexpensive; and thirdly it has to be compatable with an uncured heat vulcanizable silicone rubber mass. Talc idlely serves this purpose, however, any other non-stick powder can be utilized and be applied to cut strip 170 with the apparatus of the present invention as long as it is compatable with the uncured heat vulcanizable silicone rubber composition. It can also be appreciated that this present apparatus for continuously cutting strips of mass from a two roll mill may be utilized with other compositions other than uncured heat vulcanizable silicone rubber compositions.

At present the apparatus of the present invention can be utilized with any composition which is desired to be milled so as to be mixed to break up structuring or for any other reason, so that the composition may be taken and removed from a two roll mill in a continuous strip which is non-sticky. The coated strip 330 from apparatus 72 may then be taken and manually guided into a container or a package such that a continuous strip of uncured heat vulcanizable silicone rubber composition or other mass may be packaged into the packages of 1,000 lbs or more or less, as is desired. It can also be appreciated that even though the present invention has been somewhat specific to uncured heat vulcanizable silicone rubber composition. The present apparatus, can be applied to remove a continuous strip off a two roll mill in a continuous manner of any composition that can be milled on a two roll mill, such as the one disclosed in the instant case and this is the case where the two roll mill is used primarily for the purpose of breaking up structuring in a slab of material or whether it is utilized to mix ingredients in a sheet of material which is then going to be packaged in a continuous strip for sale to customers.

Only preferably the instant invention in one preferred embodiment of the instant invention is utilized to cut a continuous strip of 3 inches wide by 1 inch thick from a two roll mill, such as the one shown in the instant figures which continuous strip is continuously removed from the mill and continuously dusted in box 210 with talc or other non-stick powder so as to provide a non-stick strip 330, 1 inch by 3 inches wide for manually guidance into a package which may contain a continuous strip of material of 1,000 lbs. or more in a single package. It is also necessary to look at the novel adjusting means 90 in FIG. 1 of the instant case. This adjusting means detailed in FIG. 7 comprises; flange 390 which is attached to platform 80 at the other end there is a threaded rod 392, which preferably engages a female threaded surface 394 in the forward end of frame 92. Threaded rod 392 also thoroughly engages nut and reverse nut 400 at its forward end, and nut 402 at its rear end which counter to nut 400. In threaded rod 392 there is arm 404 which pivotly engages arm 406 through pin 408 which arm 404 uses hook 428 which fits against flange 390 having hook 416. Flange 390 also has stop 412 at its forward end, so as to form a groove between the hook of 416 of flange 390 and stop 412. Arm 406 has a hook member 428 which engages the groove or flange 390 and pivots on a pin 408 on connecting rod 392, hook 428 being held in place in the groove on flange 390 between stop 412 and hook 416, latch 440 and bolt 450 engaging arm 406 in groove 420 and which is being held in place by latch 440. Threaded rod 392 can be adjusted such that the frame 92 is brought further away or closer from pedestal platform 80 since frame 92 rolls on rollers 94 and 96 on tracks 102 and 104. Also, since rollers 94 and 96 are right in track 102 and roller 100 and the other corresponding roller rides in track 104 by thoroughly adjusting rod 392 and uts 396, 400 and 402, not only is frame 92 moved closer or further away from pedestal support 80 with precision but also a knife blade 152 is moved closer or farther away from roller surface 12 and from the uncured heat vulcanizable silicone rubber composition sheet 61 on roller 12 with precision and great accuracy. In addition, by counter rotating screws 400 and 402 the threaded rod is held in place without any change in the distance adjustment even though the machine may vibrate considerably in operation. This novel adjusting means 90 shows in an advantageous way to adjust the distance of knife blade 152 from roller surface 12 and from sheet 61 on roller 12. However, it should be noted that the apparatus of the instant invention will also work if another means was utilized for setting with precision the distance of knife blade 152 from roller surface of 112. There can be utilized a block or other means of stops against rollers 94 and 96 in track 102 and track 104. The preferred adjusting means of the instant case allows these knife blade settings to roller surface 12 to be made with great precision and to be maintained at that high precision through considerable vibration in the operation of the apparatus and the mill or other motions of the apparatus. It should also be noted that the knife bracket 116 of the instant case can be manipulated by piston 128 such that the knife blade 152 will be brought closer to the roller surface 12 for cutting engagement as shown in FIG. 1 or by activation of rod 124 through piston 128, the knife blade 152 can be dropped by pivoting knife bracket 116 about pin 120 in forward end of frame 92.

It is desired to change the knife blade because the old one is dulled, it is a simple matter to turn off the apparatus and drop the knife bracket 116 by activation of rod 124 and piston 128 so that the knife member 150 can be replaced and the apparatus can be put into opertion once more. Knife member 150 can be made from any hard yet durable substance such as Teflon.

Accordingly, as has been shown above, there is provided by the present invention a unique apparatus for continuously cutting a strip of solid mass, any material that can be milled on a two roll mill or a three roll mill, for that matter, and transmitting a continuous strip of such material to be dusted with a non-stick powder and then guided into any desired package. The present invention has done away with the inefficiencies, time consuming labor that was the case in the past when material was milled on a two roll mill. It should be noted that even though the present invention is not meant to provide continuous strips of material from a two roll mill in which the composition is initially mixed on the two roll mill, nevertheless, if it is desired to do such, that is, initially mix the mixture in a two roll mill and then take it from the two roll mill to a continuous strip; such can be carried out by the invention of the instant case. The only disadvantage of such a mixing procedure is that there is not prior filtering or straining of the composition after the ingredients are mixed and then processed into a continuous strip by the use of the instant invention. Nevertheless, the apparatus of the present invention can be so used and the means and ways it can be utilized are many and varied with many advantages in economy and efficiency.

I claim:
1. An apparatus for stripping continuously a solid mass in a strip from a two roll mill comprising;
    a frame with a first end and a second end opposite said first end;
    a two roll mill located adjacent said first end of said frame; knife means at said first end of said frame adapted to cut a strip of solid mass from said two roll mill;
    first roller means on said frame adjacent said knife means for passing back said cut strip of solid mass toward the second end of said frame opposite said first end;
    dusting means adjacent said first roller means through which said cut strip of solid mass passes adapted to dust said cut strip of solid mass with powder;
    second roller means in said dusting means for carrying the cut strip of solid mass through said dusting means from said first roller means and passing said cut strip of solid mass to the second end of same frame.

2. The apparatus of claim 1 wherein in the two roll mill the rolls are closer together at the end of the rolls which are furthest away from said knife means than the end adjacent said knife means and wherein said rolls travel at a different speed such that there is continuously presented a solid mass wrapped about the roll closest to said knife means and such that a solid mass is wrapped about the roll closest to the knife means is continuously presented to said knife means.

3. The apparatus of claim 2 further including vibration means over said dusting means comprising a hopper filled with non-stick powder and a vibration under said hopper causing said non-stick powder to fall into said dusting means.

4. The apparatus of claim 3 wherein said dusting means comprising a rectangular box surrounding said second roller means with a first opening overhead for non-stick powder to fall into said box and having second and third openings at its side adjacent said the first and second end of said frame through which the cut strip of solid mass passes.

5. The apparatus of claim 4 wherein said box contains air blower means at the lower portions of said box below said second roller means for continuously blowing around said non-stick powder such that it adheres on all sides of said cut strip of said solid mass as it moves through said box.

6. The apparatus of claim 5 wherein brushes are present at said third opening of said box said opening being adjacent said second end of said frame so as to sweep away excess non-stick powder on said cut strip back into said box as said strip passes out of said box.

7. The apparatus of claim 6 wherein said second rollers means comprises two fixed rollers which lie under said cut strip and a free floating roller above said cut strip and midway between said lower rollers, all of said rollers being in said box.

8. The apparatus of claim 7 wherein all of the outer surface of said rollers in said first and second roller means are constructed of soft cloth and said non-stick powder is talc.

9. The apparatus of claim 8 wherein solid mass is uncured heat vulcanizable silicone rubber compositions.

10. The apparatus of claim 9 wherein said knife means comprise a bracket pivotally attached to the front end of said frame at the upper end of said bracket there having attached a knife member adapted to come into close proximity to said two roll mill, the lower end of bracket being attached to power piston means such that said knife member can be brought into proximity of one of the rolls of said two roll mill so as to cut a strip of solid mass from said roll or said knife member can be retracted downwardly away from said mill by said power piston means.

11. The apparatus of claim 10 wherein said frame is on rollers adapted to run on two tracks.

12. The apparatus of claim 11 wherein said two roll mill is on a pedestal resting on the ground and there is adjusting means holding said frame of said apparatus the desired distance from pedestal.

13. The apparatus of claim 12 wherein said adjusting means comprise a rod which at one end screws into a receiving member in said frame and is locked into place by nut means and which at the end is connected pivotally to a lever which locks into place on said pedestal by clamping means which adjusting mean allows precise adjustment of the distance of said knife member from said roll in said two roll mill.

14. A process for continuously stripping solid mass from a two roll mill, in a strip; dusting the strip with talc for subsequent packaging the strip comprising passing the solid mass on said two roll mill in a contact with an apparatus for stripping continuously a solid mass in a strip from a two roll mill comprising;

a frame with a first end and a second end opposite said first end a two roll mill located adjacent said first end of said frame; knife means at said first end of said frame adapted to cut a strip of solid mass from said two roll mill;

cutting a strip and passing the strip to first roller means on said frame adjacent said knife means for passing back said cut strip of solid mass toward the second end of said frame opposite said first end;

passing said strip to dusting means adjacent said first roller means through which said cut strip of solid mass passes adapted to dust said cut strip of solid mass with powder;

dusting said strip by passing to second roller means in said dusting means for carrying the cut strip of solid mass through said dusting means from said first roller means and passing said cut strip of solid mass to the second end of same frame.

* * * * *